April 16, 1968 S. J. HARRIS ET AL 3,378,795

TUNEABLE INDUCTOR HAVING A FIXED ARCUATE CONDUCTOR TURN IN SERIES WITH AN INDUCTIVELY COUPLED VARIABLE ARCUATE CONDUCTOR TURN

Filed April 29, 1965 2 Sheets-Sheet 1

INVENTORS
SAMUEL J. HARRIS &
EUGENE J. CARON
BY
ATTORNEYS

April 16, 1968 S. J. HARRIS ET AL 3,378,795

TUNEABLE INDUCTOR HAVING A FIXED ARCUATE CONDUCTOR TURN IN SERIES WITH AN INDUCTIVELY COUPLED VARIABLE ARCUATE CONDUCTOR TURN

Filed April 29, 1965 2 Sheets-Sheet 2

INVENTORS
SAMUEL J. HARRIS &
EUGENE J. CARON

BY Bussen, Smith & Harding
ATTORNEYS

United States Patent Office 3,378,795
Patented Apr. 16, 1968

3,378,795

TUNEABLE INDUCTOR HAVING A FIXED ARCUATE CONDUCTOR TURN IN SERIES WITH AN INDUCTIVELY COUPLED VARIABLE ARCUATE CONDUCTOR TURN

Samuel J. Harris, Cherry Hill, N.J., and Eugene J. Caron, St. Petersburg, Fla., assignors to TRW Inc., a corporation of Ohio Filed Apr. 29, 1965, Ser. No. 451,864
4 Claims. (Cl. 334—65)

This invention relates to tuners and has particular reference to tuners for high frequency circuits, a typical frequency range being, for example, thirty to seventy-six megacycles per second, though, as will be later apparent, the invention is not limited to tuning of any particular range.

It is generally desirable that tuning throughout a given range should be accomplished within a single turn of a tuning knob. It is also desirable for tuning at high frequencies that an inductance should be varied with or without the simultaneous variation of a capacitance. A known form of L–C tuner consists of a partial-turn variable inductor and a partial-turn variable capacitor assembled on a common shaft. But such a device is limited by the inductance change which can be achieved in less than a single turn in a reasonable space. Inclusion of the inductance in an acceptable space means that its radius must be relatively small, and hence the tuner of the type just mentioned has been limited in its use to quite high frequencies considering optimum L to C ratios.

The broad object of the present invention is to provide a variable inductor having an extended tuned inductance range in a partial-turn tuner, consistent with acceptable dimensions of the tuner.

In accordance with the present invention a variable inductance is provided which, at its maximum inductance value, presents multiple turns. As is known, a multiple turn inductor has an inductance value which is derived, in effect, not only from the self-inductance of isolated incremental lengths but from the mutual inductance as well, and two turns, for example, provide a self-inductance which is considerably in excess of twice the self-inductance of a single turn of the same dimensions. While this is well-recognized, a full range of inductance variation by a contacting wiper has been considered as requiring a helical or spiral path of the wiper and more than a single turn of the tuner shaft. In accordance with the present invention, adjustment within a single revolution is achieved to secure a range of inductance change which would correspond to only considerably more than a single turn of a tuner shaft in devices of the type heretofore known.

Briefly stated, this is accomplished by simultaneously changing the effective length of the coil and progressively shorting another portion of the coil. By shorting of a turn or portion of a turn, the current induced in the shorted section will flow in such a direction as to decrease the effective inductance of the coil.

Desirably the variable inductor is associated with a variable capacitor, the tuning to progressively higher frequencies involving simultaneous decrease of inductance and capacitance. While the characteristic of tuned frequency with rotation of the tuning shaft may be accomplished by configuration of the coil, particularly involving change of width of the metal forming the coil turn or turns, it is simpler to produce a desired characteristic by the shaping of the plate configuration of the variable capacitor. Furthermore, in the case of the majority of tuning requirements, as in superheterodyne receivers, a plurality of tuned circuits are required which, controlled by a single shaft arrangement, must "track" each other, as in the usual production of an intermediate frequency output of fixed frequency derived from an oscillator which is tuned simultaneously with an antenna and/or an amplifier. This tracking is also best accomplished by variations of the plate configuration of a variable capacitor; as, for example, by the bending of segments of one or more plates thereof.

The general objects of the invention relate to the attainment of the foregoing results, and these, together with specific objects relating to details of construction and operation, will become apparent from the following description, read in conjunction with the accompanying drawings, in which.

Figure 1:
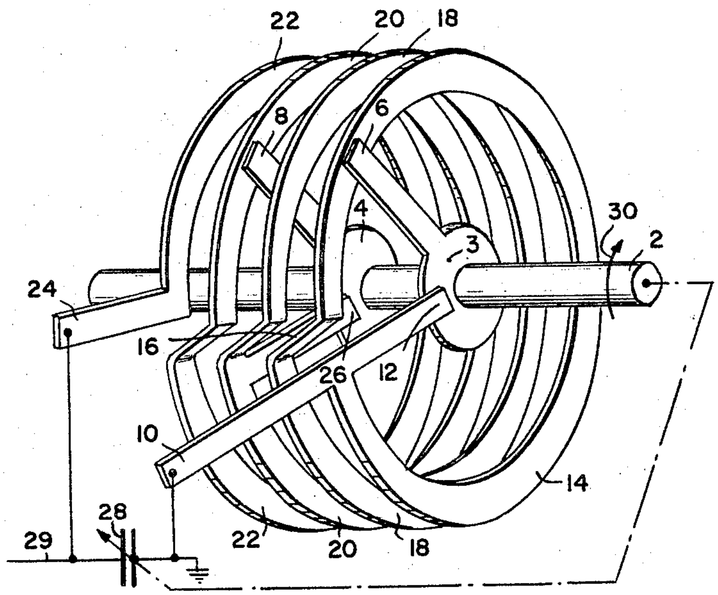
FIGURE 1 is a perspective view showing one form of the variable inductor provided in accordance with the invention and particularly explanatory of the operations involved in tuning.

Considering FIGURE 1, the variable inductor involves, essentially, four turns, maximum inductance being achieved when these are electrically in series. The insulated tuning shaft 2 has secured thereon a pair of conductive hubs 3 and 4 provided with the respective wiper arms 6 and 8. One terminal 10 of the inductor is extended at 12 to provide sliding contact with the hub 3. From this there extends the first turn 14 of the coil. In order to avoid the necessity for helical motions of the wipers 6 and 8, each turn is, for its major part, in the form of a circular flat strip located in a plane, the various turns being connected by axially extending portions of which that between the first turn 14 and the second turn 18 is indicated at 16. These portions are located within the extent of a short arc corresponding to the difference between 360° and the arc through which the wipers may move, this latter being, for example, 330° or the like to secure a maximum extent of angular adjustment range of the shaft 2. The further successive turns of the coil are indicated at 20 and 22. As will become apparent, more or less turns may be involved depending upon the inductance values and range desired.

The final turn 22 ends in the terminal 24.

As will be evident from the construction illustrated, the wiper 8 engages, during its rotation, the turn 20. The beginning of this turn is provided with a wiper extension 26 engaging the hub 4 of the wiper 8.

Connected between the terminals 10 and 24 in the usual fashion to provide a tuned circuit is a capacitor 28 which is shown as connected between ground and a lead 29 providing the terminals of the tunable LC assembly. The capacitor 28, in some cases, may be fixed; but advantageously it is variable and adjusted in capacitance by mechanical connection to the shaft 2. A desirable physical arrangement for this is described hereafter.

Considering the operation of what has just been described, it will be evident that when the wipers 6 and 8 are in their extreme clockwise positions on their respective turns 14 and 20, the configuration is such that essentially all four complete turns are in series between the terminals 10 and 24. The wipers now are substantially electrically coincident with the respective wipers 12 and 26. Thus, a maximum inductance is provided.

As counterclockwise rotation from the condition stated takes place, portions of the turns 14 and 20 are successively shorted, until, finally, when the wipers are in their extreme counterclockwise positions the turns 14 and 20 are almost completely shorted. Under these conditions, then, the inductance is essentially made up of the turns 18 and 22 in mutual inductive relationship with a pair of shorted turns. The inductance then has a minimum value. It would obviously be possible to have the end of the turn 14 adjacent to the terminal 10 disconnected from that terminal, so that, in effect, as the wiper moved counterclockwise portions of the turn 14 would be merely cut out of the circuit. But this would represent a decrease in inductance less than that achieved by the arrangement illustrated in which, as counterclockwise rotation takes place, not only would the active portion of the turn be decreased but at the same time there would be provided in mutual inductive relationship to the turns an increasing short-circuited turn. A maximum range of inductance is thus secured by the arrangement illustrated since the mutual inductance with the shorted turn provides a circulating current which detracts from the effective inductance of the assembly. If the shorted variable turn has high conductance, as is achieved by utilizing an adequately heavy strip of conductive metal, losses are low so that a high Q is maintained for the inductor.

If capacitor 28 is variable, the drive is, of course, so arranged that its capacitance decreases as the inductance decreases, thus providing a maximum change of the LC product for a given incremental change in adjustment of the shaft 2.

It will be evident that where the maximum inductance is to be large and space is not a consideraton, the turns may have a large radius and the particular configuration shown in FIGURE 1 may be mounted in obvious fashion to provide the inductance; but usually it is desirable that the assembly should occupy a minimum space and, particularly in very high frequency application, large inductances are not required. Therefore, the basic configuration may be changed to produce tuning units such as will now be described.

Figure 2:
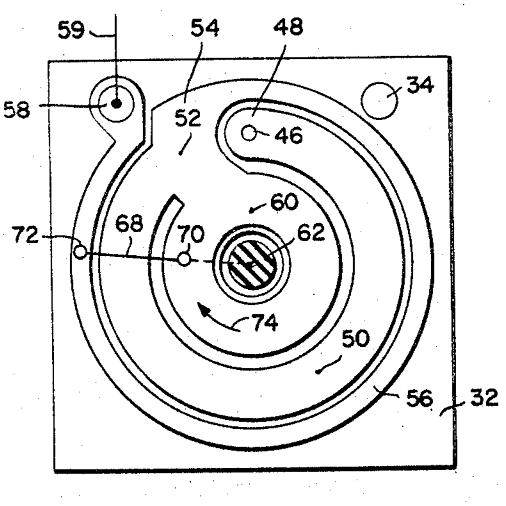
FIGURES 2 and 3 are elevations of opposite faces of a printed circuit inductor which may be provided in accordance with the invention.
Figure 3:
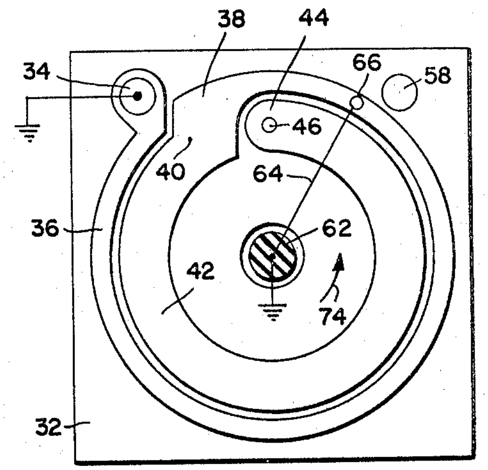

Referring next to FIGURES 2 and 3, there is illustrated the application of the invention to a physical arrangement of the printed circuit type. These figures show opposite faces of a printed circuit board and for clarity of illustration the wipers operating on the two sides are merely indicated electrically rather than physically.

The board 32, of suitably low-pass insulating material, is provided with a rivet 34 to which is electrically connected one end of the conductor strip 36 which is formed on or applied to the board in conventional fashion. This strip extends through almost a complete revolution to its portion 38 where it is continued at 40, with decrease of radius, as a further turn 42 which ends at 44 with connection to a rivet 46.

Referring, now, to FIGURE 2, this rivet 46 is again indicated and the turn 42 is continued on the other side of the board as turn 50 beginning at 48. This turn 50 runs through almost a complete circle to 52 where it is continued, beginning at 54, as a further turn 56 of larger radius, also extending through almost a full circular arc to a second terminal rivet 58 which is indicated as having an external connection at 59.

The tuning shaft is indicated at 62. This may be of insulated material carrying the wiper arms, or it may be conductive in which case a grounded arm may be electrically connected thereto. The arm 64 carried by the shaft is indicated as grounded and carries the sliding contact 66 which wipes over the turn 36. A conducting arm 68 carried by the shaft is insulated from ground and carries contact 70 which wipes over the ring 60, which is electrically connected to the region 52, and the contact 72 which wipes the turn 56. The arrows 74 indicate the same direction of rotation in the two figures. One extreme position of movement, that illustrated, involves the bridging of the two ends of the turn 56 by the arm 68 and its contacts 70 and 72. This turn is thus short-circuited. At the same time the turn 36 is short-circuited by reason of the connection of the contact 66 to ground, to which the rivet 34 is also returned. Tracing the convolutions from the rivet 58, they involve the turn 56, the turn 50 to rivet 46, the turn 42 and the turn 36. In the condition stated, the first and last are short-circuited and in mutual inductive relationship to the two turns which are not short-circuited. The inductance, therefore, is at a minimum.

If the shaft 62 is now rotated in a direction opposite that indicated by the arrows 74, the portions of the turns 36 and 56 which are short-circuited decrease, bringing also into the active turns portions of these. The result is increase of inductance reaching a maximum when the contact 66 is on the portion of the turn 36 adjacent to the rivet 34 and the contact 72 is on the turn 56 adjacent to the region 52. At such time there are substantially four turns in mutual inductive relationship with each other and without any short-circuiting. The inductance is then a maximum. It will be evident that since the insulating board 32 may be quite thin the coupling between turns is tight and consequently a relatively high maximum inductance may be achieved in a minimum space. The shaft 60 may, of course, carry the movable plates of a variable condenser as heretofore described to provide simultaneous tuning of a capacitance.

A very compact assembly of a variable inductance provided in accordance with the invention in combination with a variable condenser is illustrated in FIGURES 4 to 8, inclusive.

A frame is provided including the plates 76 and 78, spacers 80, and connecting screws, which may be of insulating material, this frame arrangement being of the general type commonly employed for the mounting of the elements of variable condensers. An operating shaft 82 is mounted in conventional bearing arrangements and supports rotatably adjustable parts. Carried by the shaft 82 are the movable condenser plates shown at 84 interleaved with the fixed condenser plate 88. Conveniently the outermost movable plates are provided with segments 86 which may be variably bent toward or away from the adjacent fixed plates to provide for the desired capacity variation law and tracking. Such condenser arrangements are well known.

Figure 4:
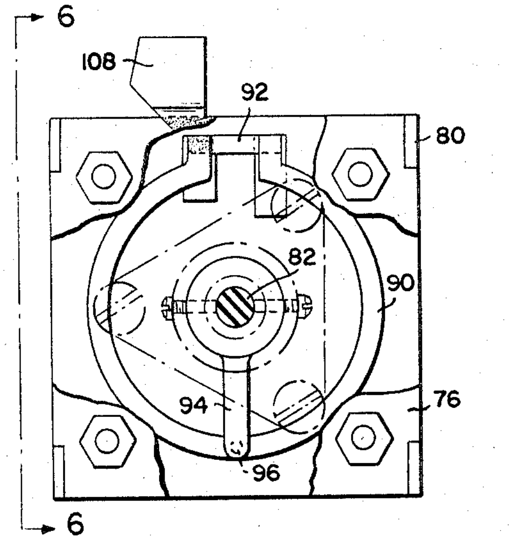
FIGURE 4 is an elevation, partially broken away to show interior details, of an embodiment of the invention involving association of a variable inductor and a variable capacitor.
Figure 7:
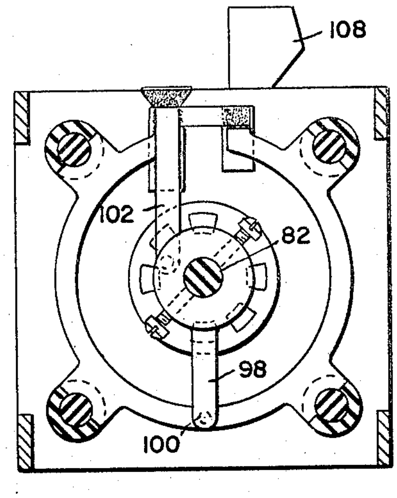
FIGURE 7 is a vertical section taken on the plane indicated at 7—7 in FIGURE 5.
Figures 5, 6:
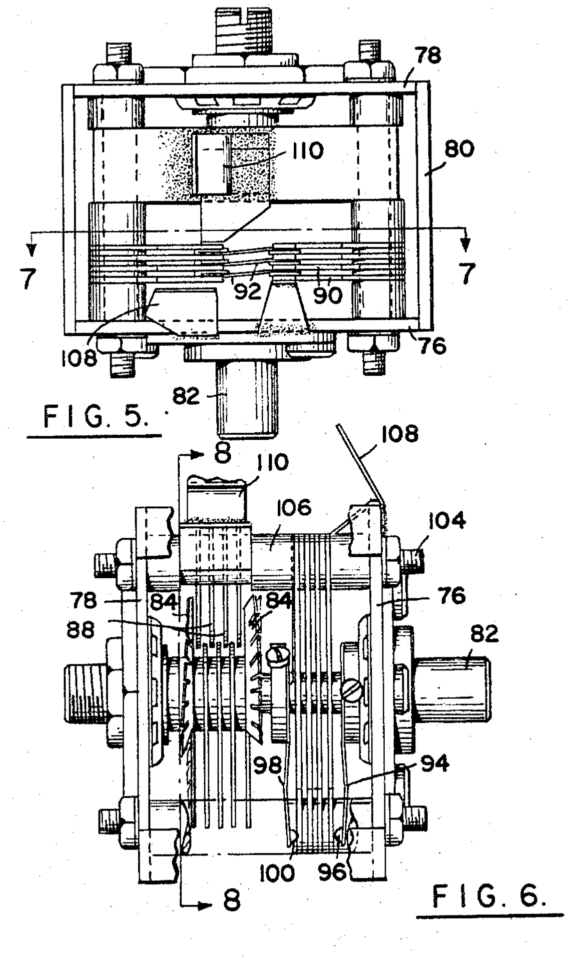
FIGURE 5 is a plan view of the same.
FIGURE 6 is a side elevation of the same viewed in the direction indicated at 6—6 in FIGURE 4.
Figure 8:
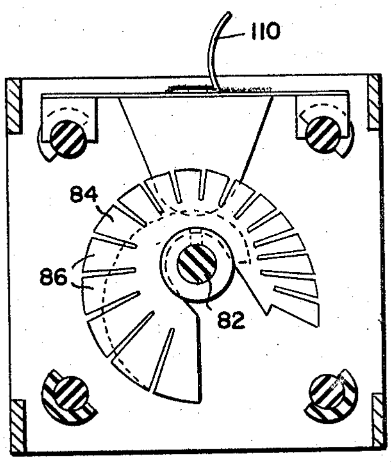
FIGURE 8 is a vertical section taken on the plane indicated at 8—8 in FIGURE 6.

The variable inductance is provided by the arcuate strips 90 providing the turns. These may be mounted by ears on the transverse screws, being insulated thereby or therefrom. As has been described with respect to FIGURE 1, these turns are desirably in individual radial planes so as to be conveniently associated with circularly moving contacts or wipers without the necessity for providing for helical motion. Continuity of the turns from one to the next is provided by bridging strips 92. As illustrated in FIGURE 4, a wiper arm 94 secured mechanically to the shaft 82 is provided with a contact button engaging one of the outermost turns 90, while a similar arm 98 also mechanically connected to the shaft is provided with a button 100 engaging and wiping the other end turn. A wiper 102 maintains contact with the hub of the wiper arm 98 providing a lead thereto. As shown in FIGURE 7, this is connected to the turn wiped by the button 100. Terminals 108 and 110 are connected to the ungrounded ends of the coil and condenser, respectively. The movable plates and the wiper 98 may be connected together and grounded through the shaft 82. These interconnections are, of course, subject to arbitrary choice, depending upon the desired placement of the tuner in associated circuitry. The operation of this specific embodiment of the invention need not be described in detail since it corresponds to the arrangements previously described, involving the progressive shorting of turns in the adjustment from low frequency to high frequency resonance.

It will be evident from the foregoing that there is provided in accordance with the invention an arrangement of a variable inductance which, for a given size, has an unusually extended range of inductance variation and, consequently, in association with a capacitor, a correspondingly large tuning range. This is accomplished with only less than a single turn of rotation of a tuning shaft without the necessity for driving such shaft through gearing to provide multiple rotation with a single tuning rotation. Provisions for helical motions of wipers are also eliminated.

It will be evident that numerous variations in details may be made without departing from the invention as defined in the following claims.

What is claimed is:

1. A tunable inductor comprising a first arcuate conductive turn having a fixed self-inductance, and a second arcuate conductive turn connected in series with said first turn, said turns being disposed in mutual additive inductive relation to each other, a conductive wiped mounted for relative rotation with respect to said turns and having one end in variable electrical engagement with and along said second turn and conductively connected to a point on said second turn so that it provides a short circuit of the portion of said second turn between its contact therewith and said point and provides an unshorted portion of said second turn, the arrangement being so disposed that, as the wiper progressively increases the shorted portion of said second turn, it progressively decreases the unshorted portion thereof.

2. A tunable inductor according to claim 1 in which said second turn is disposed substantially in a single plane so that relative movement of said second turn and said wiper occurs substantially in said plane.

3. A tunable inductor according to claim 1 in which said turns are stationary and in which said wiper is carried by a rotatable shaft substantially concentric with said turns.

4. A tunable inductor in accordance with claim 1 in combination with a variable capacitor having relatively movable plates, and means connecting movable elements of both the inductor and capacitor for simultaneous adjustment.

References Cited

UNITED STATES PATENTS

| | | | |
|---|---|---|---|
| 2,511,586 | 6/1950 | Hubbard | 333—82 |
| 2,543,560 | 2/1951 | Thias | 336—149 X |
| 2,711,518 | 6/1955 | Perelstrus. | |
| 2,834,949 | 5/1958 | Pan et al. | 334—43 X |
| 2,858,440 | 10/1958 | Giacoletto | 334—72 X |

FOREIGN PATENTS

| | | | |
|---|---|---|---|
| 990,569 | 7/1960 | Great Britain. | |

HERMAN KARL SAALBACH, *Primary Examiner.*

S. CHATMON, Jr., R. F. HUNT, *Assistant Examiners.*